Sept. 3, 1968          H. WEISS          3,399,848
DEVICE FOR PREVENTING TRAILING-EDGE FLUTTERING
OF PARAGLIDER AIRFOILS
Filed Oct. 10, 1966
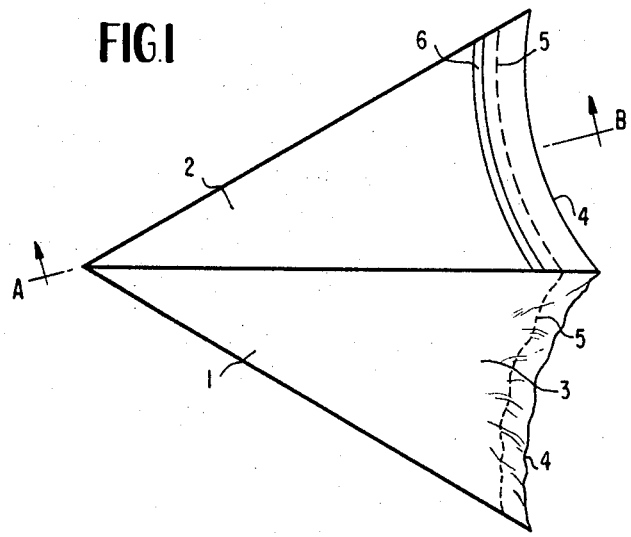
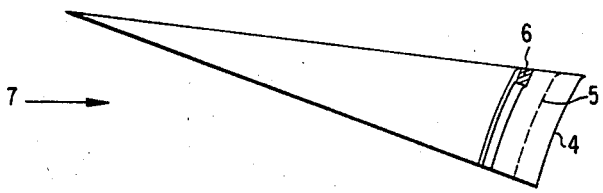
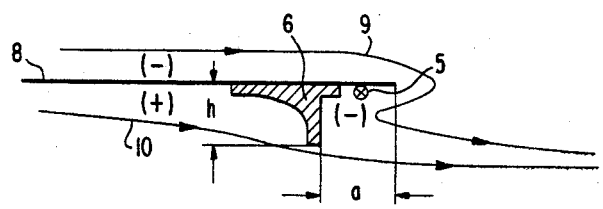
INVENTOR
HANSJÜRGEN WEISS
BY    *James E. Bryan*
ATTORNEY

United States Patent Office 3,399,848
Patented Sept. 3, 1968

3,399,848
DEVICE FOR PREVENTING TRAILING-EDGE FLUTTERING OF PARAGLIDER AIRFOILS
Hansjurgen Weiss, Friedrichshafen, Germany, assignor to Dornier System G.m.b.H., Friedrichshafen, Germany, a limited-liability corporation of Germany
Filed Oct. 10, 1966, Ser. No. 585,423
10 Claims. (Cl. 244—41)

ABSTRACT OF THE DISCLOSURE

A longitudinal keel has leading edge members extending angularly rewardly from the forward end thereof and flexible airfoils are secured between the keel and these leading members. An elogated aerodynamically-disturbing means is carried on the underside of each of the airfoils and is disposed equidistantly from the adjacent trailing edge of the airfoils throughout the length of the disturbing means. The distance of the aerodynamically-disturbing means and the height thereof are appriximately equal to the thickness of the boundary layer at the position of the aerodynamically-disturbing means.

---

This invention relates to paraglider aircraft and, more particularly, to a device for preventing the undesirable fluttering of the flexible trailing edges of the airfoils or wings within the useful range of the flight angle of attack.

A peculiarity of flexible airfoils is the tendency thereof to fluttering, particularly at elevated aerodynamic pressures. This phenomenon is of particular importance for a paraglider airfoil or wing in which the camber is freely effected, i.e., without specific supporting or tensioning means, but merely due to the action of the aerodynamic forces. A strong fluttering of the entire covering material or fabric occurs, for example, within the range of small angles of incidence if the aerodynamic forces which contribute to stretching the fabric become smaller than the net weight of the latter. These ranges of the angle of attack, accordingly, are avoided in normal flight.

Fluttering phenomena can be observed also in the normal positive flight angle of attack range. This particularly applies to the areas of the free fabric or cloth end. Apart from the increase of the drag and the disturbing noise resulting therefrom, these fluttering phenomena can attain, at higher aerodynamic pressures, an intensity such that the rigidity or strength of the fabric is exceeded and cracks are formed which endanger the entire aircraft. The maximum permissible speeds of paraglider aircraft also are limited to a great extent by these fluttering phenomena.

It is known to reduce such fluttering in a manner similar to that employed in the case of sails by means of flexible battens which are inserted into pockets in the fabric or cloth, in the longitudinal direction. The effect of this, however, is not satisfactory. Large portions of the areas of the covering fabric which are subject to fluttering remain without reinforcement. The fluttering waves occuring at the trailing edge extend preponderantly in a direction transverse to the direction of air flow, i.e., parallel to the trailing edge, and are, therefore, insufficiently suppressed by the longitudi nally-disposed reinforcing members.

Furthermore, difficulties arise in the case in which the aircraft has extendible wings, wherein the fabric must be closely packed in order to fit into a small space. A further measure which has been taken to prevent trailing-edge fluttering consists in the tightening of a leech in the trailing edge. When the airflow begins, a camber is produced but the main or principal wing is slightly deformed within the area thereof. While it is possible to prevent trailing-edge fluttering if the leech is sufficiently tightened, the drag coefficient or factor is increased. A significant disadvantage of this construction is that the pitching or longitudinal moment behavior is altered in an undesirable and partially undefined manner, in dependence upon the dynamic pressure and the angle of attack. Moreover, it is difficult to sufficiently tighten the leech at higher speeds without stressing the freely-positioned ends of the outer spars excessively, with resulting bending. Since the control of the longitudinal or pitching moment behavior is a primary problem in paragliders, prevention of fluttering with the use of a leech can not be employed in many cases.

The present invention eliminates the disturbing fluttering phenomena in the trailing edge area of paraglider airfoils while avoiding the disadvantages of known systems. More especially, unfavorable effects on the longitudinal or pitching moment behavior and the aerodynamic drag are avoided. In the present invention, an aerodynamic-disturbing strip is mounted on the pressure side of the wing parallel to the trailing edge thereof and at a right angle to the flexible surface. The height of the strip and the distance thereof from the trailing edge are approximately equal to the thickness of the boundary layer at the position of the strip.

This aerodynamically-disturbing strip advantageously is made from a resilent material, the rigidity of which when enhanced by suitable shaping suffices, on the one hand, to withstand the relatively low flow pressure in the boundary layer and yet will adjust, on the other hand, to the respective wing camber or curvature in the span direction without deformation of the covering fabric. Particularly suitable is a profiled strip made from rubber or foam rubber, and the like, which is cemented to the wing. The height of the strip preferably is equal to the distance of the strip from the trailing edge of the wing.

The present invention does not utilize the customary solution of mechanical reinforcement of the trailing edge area which is subject to fluttering, but it achieves, with aerodynamically-acting means, that the rear aerodynamic stagnation line will be positioned at a point of stable pressure conditions. As a result, the initiation of fluttering vibrations is effectively prevented by the alternate self-reinforcing of changes in the camber of the covering fabric and pressure changes within the area of the boundary layer.

The invention will be further illustrated by reference to the accompanying drawings in which:

FIGURE 1 is a bottom view of a paraglider wing or airfoil with an aerodynamically-disturbing strip being mounted on one side thereof, FIGURE 2 is a longitudinal cross-sectional view, taken on line A–B of Figure 1, through the paraglider wing, and FIGURE 3 illustrates the flow conditions within the area of the disturbing strip.

In FIGURE 1, reference numerals 1 and 2 designate the two curved wing or airfoil halves consisting of a flexible covering material such as a fabric. Indicated on the wing half 1 is the fluttering area 3 within the region of the trailing edge 4, the area 3 being produced at the normal flight angle of attack. The rear aerodynamic stagnation line 5 is present on the upper side of the airfoil and extends at different distances from the trailing edge 4. The position of the aerodynamic stagnation line 5 continually chronologically changes.

On the wing half 2, the aerodynamically-disturbing strip 6 of the present invention is mounted at the underside of the airfoil over the entire span at the same distance from the trailing edge 4. The rear aerodynamic stagnation line 5 travels, in this case, to the underside of the covering fabric and will assume a stationary position in the low pressure area downstream behind the strip 6. This position is maintained also in the case of small accidental changes in the shape of the covering material adjacent thereto by virtue of the stable pressure conditions. The initiation of fluttering waves thus is effectively prevented.

FIGURE 2 is a view in cross-section through the wing half provided with the aerodynamically-disturbing strip 6 and shows the spatial provision of this construction. The arrow 7 indicates the direction of airflow.

FIGURE 3 also shows, in a cross-sectional view, the flow conditions of the boundary layer area or region within the zone of the strip 6. Reference numeral 8 designates therein the flexible covering material and the strip 6, being provided in a profiled manner consists, for example, of foam rubber and is cemented onto the fabric covering. The configuration of the side of the strip 6 facing upstream is not particularly important and largely may be adapted to the particular requirements relative to material and rigidity. Favorable versions of paraglider wings or airfoils which are extendable are strips having profiles which require very little space and do not cause difficulties when stowed within a small storage space. Reference numeral 9 identifies an adjacent airflow line at the top side of the wing while reference numeral 10 identifies the adjacent airflow line at the lower side of the wing. The symbols (+) and (−) designate high and low pressure areas, respectively, with respect to the static pressure of the undisturbed airflow. Reference numeral 5 is employed in this figure to designate the rear aerodynamic stagnation point which results at the point of intersection of the stagnation line 5 with the plane of projection. The height $h$ of the strip 6 need not be greater than the thickness of the boundary layer at this point. It has been found to be particularly favorable for the distance $a$ of the strip 6 from the trailing edge 4 to be equal to the distance $h$.

As a result of the construction of the present invention, fluttering of the fabric covering in the rear area of paraglider airfoils and similar aerodynamically-active surfaces including flexible covering elements, such as sails, for example, is effectively prevented within the normal range of the angle of attack. The cost of the present invention is low, the aerodynamic factors or coefficients are altered to a negligible extent only and, particularly, the longitudinal or pitching moment course over the angle of attack undergoes only a negligible parallel displacement within the range of the useful angle of attack. The advantage of the foldability of such flexible airfoils and the possibility of stowing them within a limited amount of space is in no way impaired by the construction of the present invention.

It will be obvious to those skilled in the art that many modifications may be made within the scope of the present invention without departing from the spirit thereof, and the invention includes all such modifications.

What is claimed is:

1. A paraglider aircraft including a longitudinal keel, leading edge members extending angularly rearwardly from the forward end of said keel on opposite sides thereof, and airfoils secured to and between said keel and said leading edge members, said airfoils being flexible and assuming an upwardly bowed configuration under aerodynamic load, said airfoils each having an upper surface and an undersurface, and elongated aerodynamically-disturbing means carried on the undersurface of each of said airfoils and disposed adjacent to and substantially equidistantly from the adjacent trailing edge of the associated airfoils throughout the length of said aerodynamically-disturbing means.

2. Apparatus as defined in claim 1 wherein each of said airfoils comprises solely a sheet-like flexible member.

3. Apparatus as defined in claim 2 wherein each of said airfoils is formed of fabric.

4. Apparatus as defined in claim 1 wherein said aerodynamically-disturbing means is spaced from the trailing edge of the associated airfoils a distance approximately equal to the thickness of the boundary layer at the position of the aerodynamically-disturbing means.

5. Apparatus as defined in claim 1 wherein the height of said aerodynamically-disturbing means is approximately equal to the thickness of the boundary layer at the position of the aerodynamically-disturbing means.

6. Apparatus as defined in claim 1 wherein the height of said aerodynamically-disturbing means as well as the distance thereof from the trailing edge of the associated airfoil are approximately equal to the thickness of the boundary layer at the position of the aerodynamically-disturbing means.

7. Apparatus as defined in claim 1 wherein said aerodynamically-disturbing means is made from profiled resilient material, and the side thereof facing downstream has, in longitudinal cross-section, a line of intersection normal to the undersurface of the associated airfoils.

8. Apparatus as defined in claim 1 wherein said flexible airfoils are formed of fabric, said aerodynamically-disturbing means being formed of an elastomeric substance, and adhesive means securing said aerodynamically disturbing means to the associated airfoils.

9. Apparatus as defined in claim 1 wherein said aerodynamically-disturbing means comprises an elongated strip of resilient material extending across the entire width of the associated airfoils.

10. Apparatus as defined in claim 1 wherein each of said airfoils comprises solely a sheet-like flexible member, said aerodynamically-disturbing means comprising a strip of resilient material, the height of said strip as well as the distance thereof from the trailing edge of the associated airfoils being approximately equal to the thickness of the boundary layer at position of the strip, said strip extending substantially at right angles to the undersurface of the associated airfoils.

References Cited

UNITED STATES PATENTS

| | | | |
|---|---|---|---|
| 1,549,223 | 8/1925 | Schleusner | 244—41 |
| 3,108,766 | 10/1963 | Beckman | 244—40 |
| 3,223,361 | 12/1965 | Girard | 244 |

MILTON BUCHLER, *Primary Examiner.*

THEODORE MAJOR, *Assistant Examiner.*